United States Patent
Okada et al.

(10) Patent No.: US 8,284,040 B2
(45) Date of Patent: Oct. 9, 2012

(54) RECEIVER SYSTEM FOR VEHICLES

(75) Inventors: Noriaki Okada, Chiryu (JP); Hiroyuki Tsuji, Anjo (JP); Kentarou Asai, Anjo (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 329 days.

(21) Appl. No.: 12/617,947

(22) Filed: Nov. 13, 2009

(65) Prior Publication Data

US 2010/0123569 A1 May 20, 2010

(30) Foreign Application Priority Data

Nov. 19, 2008 (JP) .................................. 2008-295361

(51) Int. Cl.
*B60C 23/02* (2006.01)
*B60R 25/00* (2006.01)

(52) U.S. Cl. .............. 340/442; 340/426.36; 340/426.13; 340/426.17; 455/41.1; 455/41.2; 455/41.3; 307/10.1

(58) Field of Classification Search .................. None
See application file for complete search history.

(56) References Cited

U.S. PATENT DOCUMENTS

| | | | | |
|---|---|---|---|---|
| 7,026,953 B2* | 4/2006 | Fujii | | 340/870.16 |
| 7,068,158 B2* | 6/2006 | Komatsu et al. | | 340/445 |
| 7,113,083 B2* | 9/2006 | Suitsu | | 340/442 |
| 7,171,293 B2* | 1/2007 | Ichikawa et al. | | 701/36 |
| 7,423,532 B2* | 9/2008 | Stewart et al. | | 340/572.1 |
| 7,474,195 B2* | 1/2009 | Farrell | | 340/5.72 |
| 2003/0046993 A1 | 3/2003 | Fujii | | |
| 2005/0003781 A1* | 1/2005 | Kunz et al. | | 455/226.1 |
| 2005/0134284 A1* | 6/2005 | Hoff et al. | | 324/511 |
| 2006/0164210 A1* | 7/2006 | Ikeo | | 340/5.72 |
| 2009/0009303 A1* | 1/2009 | Fujioka et al. | | 340/426.36 |
| 2009/0121919 A1* | 5/2009 | Kihara | | 342/173 |
| 2010/0210234 A1* | 8/2010 | Hyde et al. | | 455/272 |

* cited by examiner

*Primary Examiner* — Benjamin C Lee
*Assistant Examiner* — Rajsheed Black-Childress
(74) *Attorney, Agent, or Firm* — Nixon & Vanderhye PC

(57) ABSTRACT

A tire air pressure detection system and a remote key entry system have first and second receiver units, respectively. The first receiver unit has a change-over switch, which selectively outputs to a chassis ECU an output signal of either one of the first and second receiver units. Thus, the chassis ECU can receive any one of the output signals by only one interface.

7 Claims, 5 Drawing Sheets

RECEIVER SYSTEM FOR VEHICLES

CROSS REFERENCE TO RELATED APPLICATION

This application is based on and incorporates herein by reference Japanese Patent Application No. 2008-295361 filed on Nov. 19, 2008.

FIELD OF THE INVENTION

The present invention relates to a receiver system for vehicles, which processes and outputs to an electronic control unit (ECU) signals received from different transmitters, for example, a sensor transmitter of a tire air pressure detection system and a transmitter of a remote key of a remote key entry system.

It is conventional that a tire air pressure detection system and a remote key entry system in a vehicle have radio wave receiver units, respectively. The receiver units output the received signals to the corresponding ECUs. For example, a tire air pressure detection system has a receiver unit 102 as shown in FIG. 2, and a remote key entry system has a receiver unit 112 as shown in FIG. 3.

In the tire air pressure detection system, as shown in FIG. 2, a sensor transmitter 101 attached to a tire wheel transmits a data signal including tire air pressure-related data indicative of a detected tire air pressure or a detected tire air temperature, and the receiver unit 102 receives and outputs this data signal to a chassis ECU 103. The chassis ECU 103 checks whether the detected tire air pressure is normal or not, and drives a meter 104 by a control area network communication (CAN) to generate an alarm indicating abnormality of the tire air pressure if the tire air pressure becomes too low. The receiver unit 102 includes a receiver antenna 102a, a receiver circuit (RCV) 102b for receiving the signal of the sensor transmitter 101, which is in a predetermined frequency band, a microcomputer (MC) 102c, and an interface (I/F) 102d. The microcomputer 102c processes the signal received by the receiver circuit 102b. The interface 102d performs local communications between the microcomputer 102c and the chassis ECU 103. The chassis ECU 103 also has an interface 103a and a microcomputer 103b. The interface 103a also performs local communications between the receiver unit 102 and the microcomputer 103b. The microcomputer 103b processes the received signal and checks whether the tire air pressure is normal or abnormal based on the received signal.

In the remote key entry system, as shown in FIG. 3, a key transmitter 111 attached to a remote control key (remote key) transmits a door lock/unlock signal, and the receiver unit 112 receives and outputs this signal to a chassis ECU 113. The chassis ECU 113 outputs a received door lock signal or door unlock signal to a door control ECU 114, which in turn controls a door actuator 115 to lock or unlock doors. The receiver unit 112 includes a receiver antenna 112a, a receiver circuit (RCV) 112b for receiving the signal of the key transmitter 2, which is in a predetermined frequency band, a microcomputer (MC) 112c, and an interface (I/F) 112d. The microcomputer 112c processes the signal received by the receiver circuit 112b. The interface 112d performs local communications between the microcomputer 112c and the chassis ECU 113. The chassis ECU 113 also has an interface 113a and a microcomputer 113b. The interface 113a also performs local communications between the receiver unit 112 and the microcomputer 113b. The microcomputer 113b processes the received signal and checks whether the received signal indicates a command of door locking or door unlocking.

It is not cost-effective to separately provide the chassis ECUs 103 and 113 for the tire air pressure detection system and the remote key entry system, respectively, in a case that the receiver units 102 and 112 are provided separately. Accordingly, it is proposed to provide only one chassis ECU 120 for both of a tire air pressure detection system and a remote key entry system as shown in FIG. 4.

According to this receiver system shown in FIG. 4, the chassis ECU 120 can be shared by both systems. However, the chassis ECU 120 is configured to include two interfaces 120a and 120b. The interface 120a performs local communications with the receiver unit 102 of the tire air pressure detection system, and the interface 120b performs local communications with the receiver 112 of the remote key entry system.

JP 3789335 (US 2003/0046993 A1) proposes to provide only one receiver unit 130 for both of a tire air pressure detection system and a key entry system as well as only one chassis ECU 120 as shown in FIG. 5. In this system, if the frequency of a data signal transmitted from a sensor transmitter 101 of a tire air pressure detection system and the frequency of a door lock/unlock signal transmitted from a remote key entry system differ from each other, both signals can be received properly by the receiver unit 130 by changing over or selecting a reception frequency band of a receiver circuit 130a of the receiver unit 130.

However, the most appropriate positions of the receiver units differ each other between the tire air pressure detection system and the remote key entry system. In the tire air pressure detection system, in particular, the frequency of the data signal is limited to about 433 MHz in Europe and to about 315 MHz in the U.S. If the allowable signal to be used is limited to only high frequency and short wavelength as in the former case (Europe), it becomes more likely that the position (null point) of the sensor transmitter, by which the receiver unit is enabled to receive the data signal of the sensor transmitter more efficiently, is limited. For this reason, it is not always advantageous to share one receiver unit by two different systems.

SUMMARY OF EXEMPLARY EMBODIMENTS

It is therefore an object of the present exemplary embodiment to provide a receiver system for vehicles, in which an interface of an electronic control unit can be shared in a case that signals transmitted from a sensor transmitter of a tire air pressure detection system and a key transmitter of a remote key entry system are received by respective receiver units.

According to the present exemplary embodiment, a receiver system for vehicles is provided in combination with a first transmitter and a second transmitter, which transmits respective data signals. The first transmitter and the second transmitter are, for example, a tire air pressure sensor and a remote key transmitter, respectively. The receiver system comprises a first receiver unit, a second receiver unit and an electronic control unit.

The first receiver unit includes a first antenna for receiving the data signal of the first transmitter, a first receiver circuit for receiving an output signal of the first antenna corresponding to the data signal of the first transmitter, a first microcomputer for receiving an output signal of the first receiver circuit corresponding to the output signal of the first antenna, and a first interface for receiving and outputting an output signal of the first microcomputer corresponding to the output signal of the first receiver circuit.

The second receiver unit includes a second antenna for receiving the data signal of second transmitter, a second receiver circuit for receiving an output signal of the second antenna corresponding to the data signal of the second transmitter, a second microcomputer for receiving an output signal of the second receiver circuit corresponding to the output signal of the second antenna, and a second interface for receiving and outputting an output signal of the second microcomputer corresponding to the output signal of the second receiver circuit.

The electronic control unit includes a third interface for receiving the output signals of the first interface and the second interface as output signals of the first receiver unit, and the second receiver unit, and a third microcomputer for producing an output signal by processing an output signal of the third interface.

The first receiver unit includes a change-over switch, which is controllable by the first microcomputer, for selecting and transmitting one of the output signals of the first microcomputer and the second receiver unit to the electronic control unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to one embodiment, in which a receiver system for vehicles is applied to two different systems, for example, a tire air pressure detection system and a remote key entry system, in which two receiver units are provided.

Figure 1:
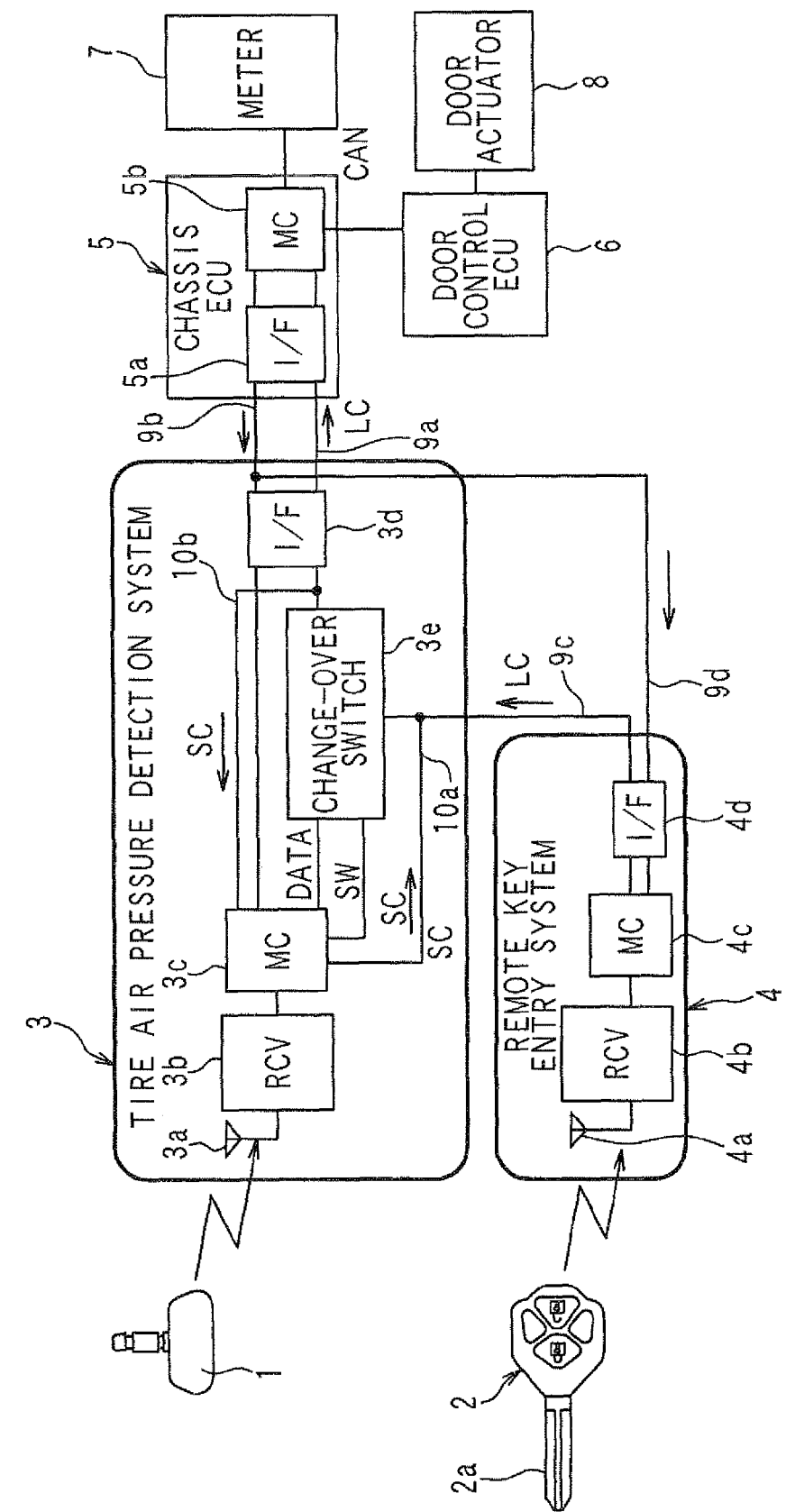
FIG. 1 is a schematic block diagram showing one embodiment of a receiver system for vehicles according to the present invention, which is applied to a tire air pressure detection system and a remote key entry system.
Figure 2:
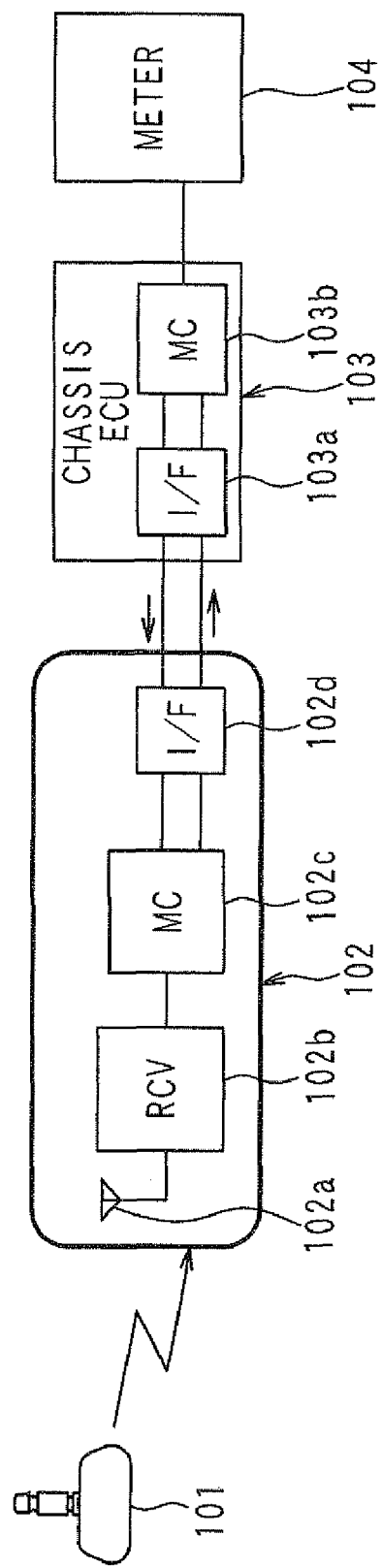
FIG. 2 is a schematic block diagram showing a conventional receiver system, which is applied to a tire air pressure detection system.
Figure 3:
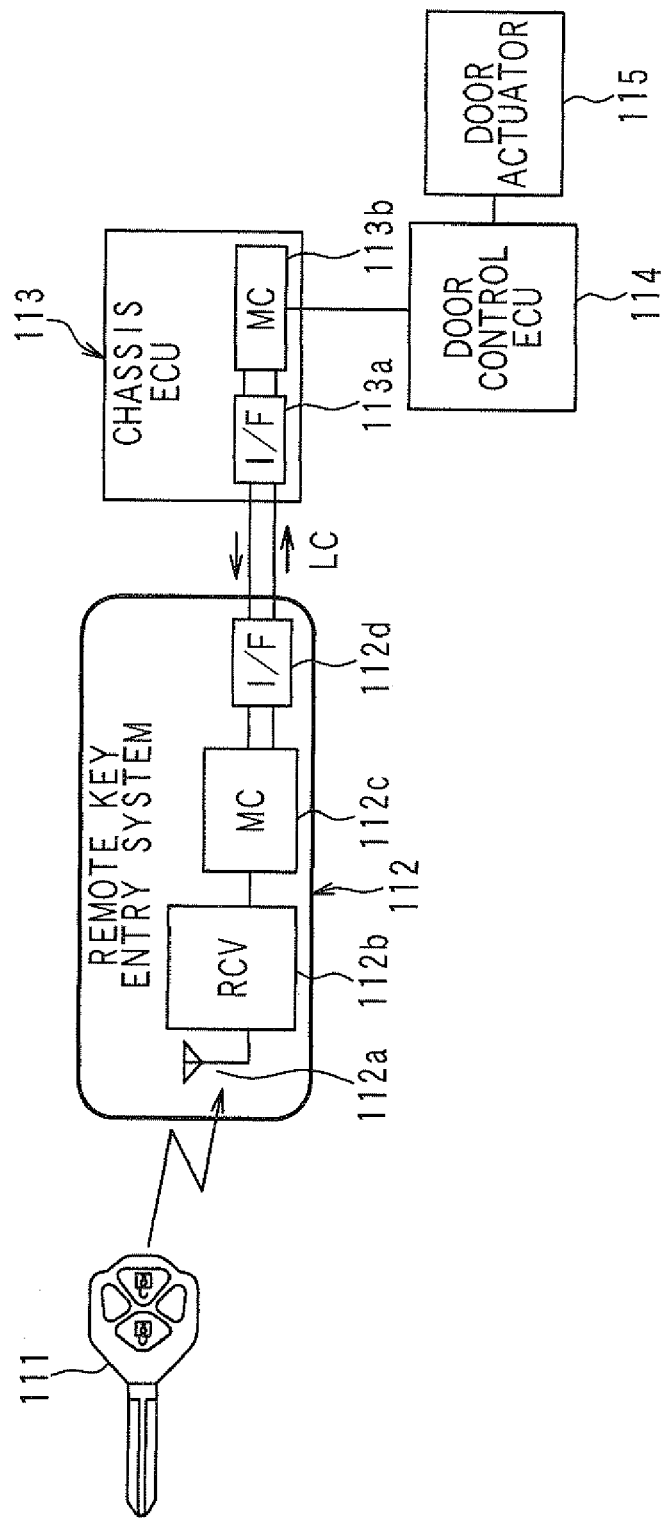
FIG. 3 is a schematic block diagram showing a conventional receiver system, which is applied to a remote key entry system.
Figure 4:
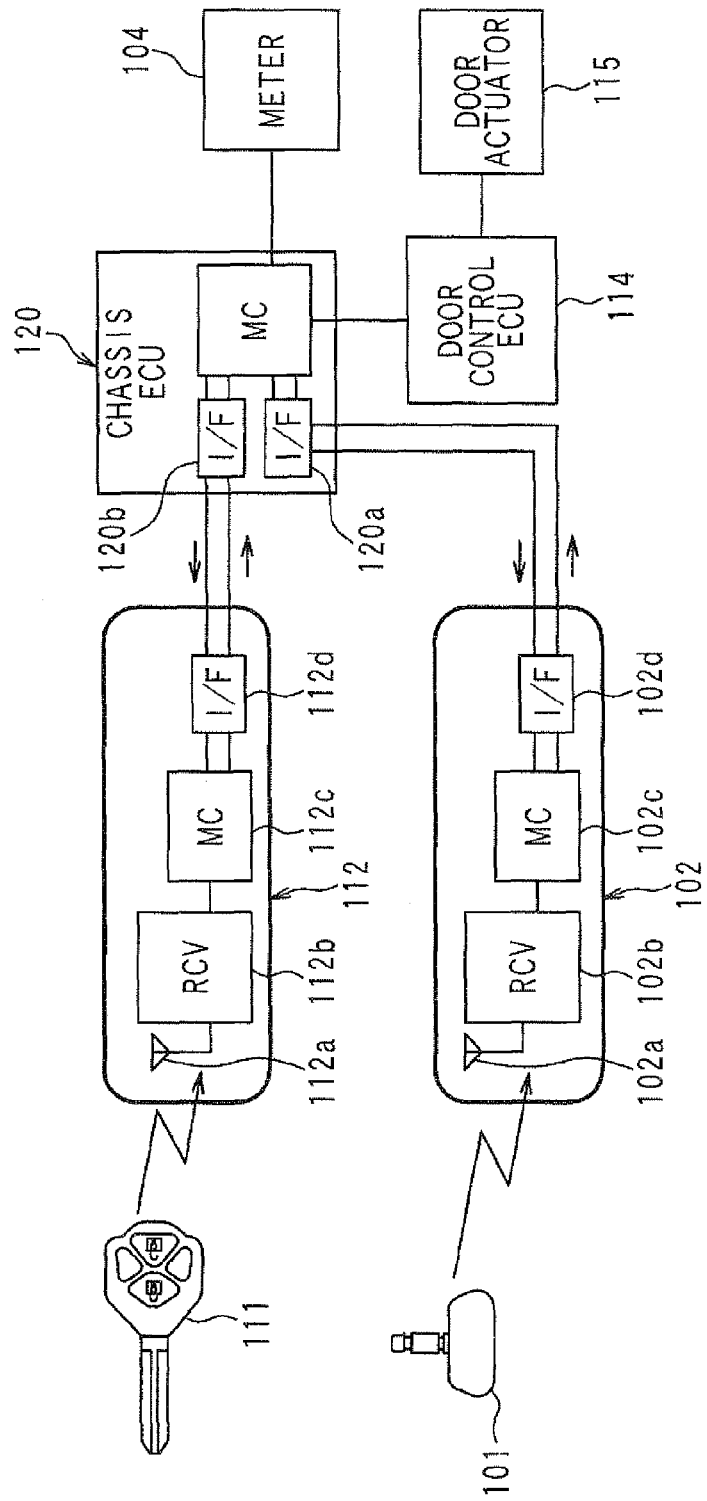
FIG. 4 is a schematic block diagram showing a conventional receiver system, in which one receiver unit is shared by a tire air pressure detection system and a remote key entry system.
Figure 5:
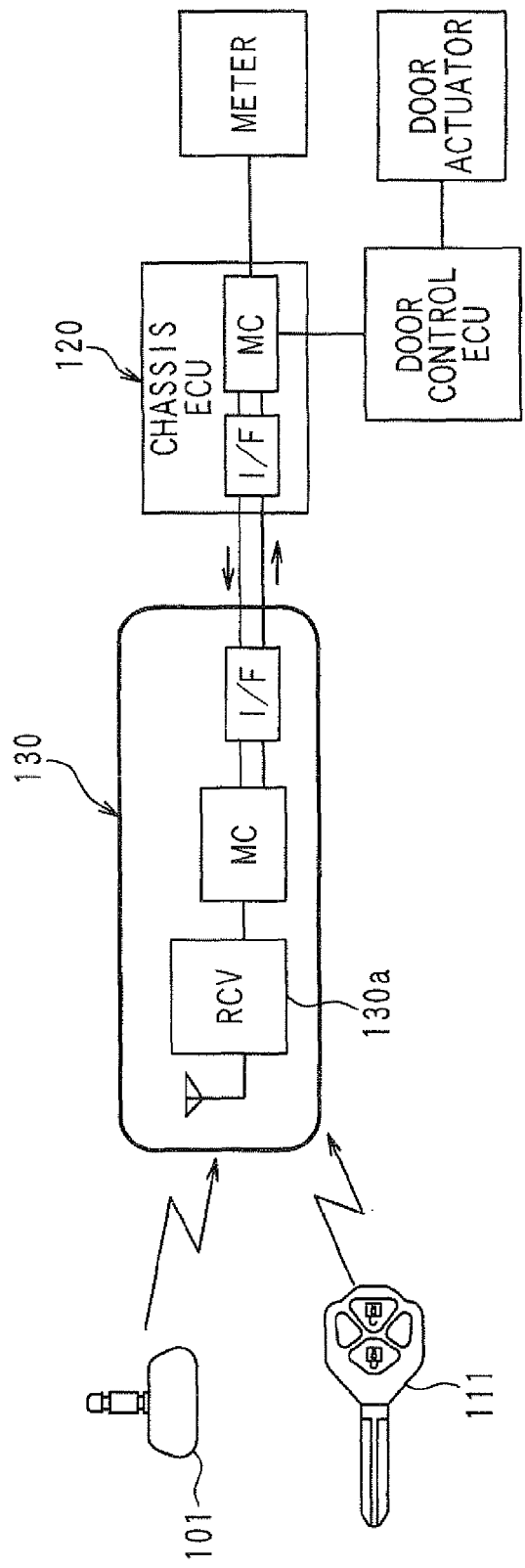
FIG. 5 is a schematic block diagram showing a conventional receiver system, in which one receiver and one ECU are shared by a tire air pressure detection system and a remote key entry system.

Referring to FIG. 1, a receiver system for vehicles is provided for receiving radio waves of a sensor transmitter (first transmitter) 1 attached to a tire wheel (not shown) and a key transmitter (second transmitter) 2 of a key carried by a user of a vehicle (not shown). The receiver system includes first and second receiver units 3 and 4 and a chassis ECU 5, which are provided in the vehicle. The chassis ECU 5 is connected to a door control ECU 6 for a door actuator 8 and a meter 7. The chassis ECU 5 and the door control ECU 6 are control ECUs for controlling the meter 7 and the door actuator 8, respectively.

The tire air pressure detection system is formed of the sensor transmitter 1, the receiver unit 3, the chassis ECU 5 and the meter 7. The remote key entry system is formed of the key transmitter 2, the receiver units 3, 4, the chassis ECU 5, the door control ECU 6 and the door actuator 8. The receiver system for vehicles is thus formed of the receiver units 3, 4, the chassis ECU 5 and the like.

The sensor transmitter 1 has a sensing part, which senses a tire air pressure and a tire air temperature and transmits a radio wave of a data signal including data indicating a sensed tire air pressure. The radio wave of the data signal transmitted by the sensor transmitter 1 and received by the receiver unit 3 is in the frequency of about 315 MHz in the U.S. and in the frequency of about 433 MHz in Europe, for example. The sensor transmitter 1 is attached to a rim of each tire wheel of the vehicle with its sensing part being disposed inside the tire to sense the tire air pressure and the tire air temperature. The data signal of each sensor transmitter 1 includes a specific identification code (ID), which is different from transmitter to transmitter, that is, different from tire wheel to tire wheel. Based on the specific ID included in the data signal, the receiver unit 3 checks whether the received data signal is transmitted from the subject vehicle or other vehicles and further determines the specific tire wheel to which the sensor transmitter 1 is attached.

The key transmitter 2 is manipulated by a user and transmits a radio wave of a data signal including data of a command of locking or unlocking of doors. The radio wave of the data signal transmitted by the key transmitter 2 and received by the receiver unit 4 is in the frequency of about 315 MHz, for example. The key transmitter 2 is integrated with an ignition key 2a, which is inserted into a key cylinder to start an engine in the conventional manner. The data signal of each key transmitter 2 also includes a specific identification code (ID), which is different from transmitter to transmitter, that is, different from vehicle to vehicle. Based on the specific ID included in the data signal, the receiver unit 4 checks whether the received data signal is transmitted from the key transmitter 2 of the subject vehicle or other vehicles.

The receiver unit 3, which receives the data signal transmitted from the sensor transmitter 1, is configured with a first receiver antenna 3a, a first receiver circuit 3b, a first microcomputer (MC) 3c, a first interface (I/F) 3d and a change-over switch 3e.

The receiver unit 3 receives the radio wave of the data signal of each sensor transmitter 1 through the receiver antenna 3a and processes the data signal before being applied to the microcomputer 3c.

The receiver circuit 3b receives the data signal by the superheterodyne system for example. If the data signal is about 315 MHz as in the U.S., the receiver circuit 3b mixes the received data signal of 315 MHz with the frequency of 304.3 MHz thereby to down-convert the frequency of the data signal to 10.7 MHz, which is a difference between 315 MHz and 304.3 MHz. If the data signal is about 433 MHz as in Europe, the receiver circuit 3b mixes the received data signal of 315 MHz with the frequency of 422.3 MHz thereby to down-convert the frequency of the data signal to 10.7 MHz, which is a difference between 433 MHz and 422.3 MHz. The receiver circuit 3b wave-detects the signal of 10.7 MHz. Thus, a plurality of data signals of different frequency bands can be received by only one receiver circuit 3b.

The microcomputer 3c produces an output signal to the chassis ECU 5 through the change-over switch 3e and the interface 3d. This output signal may be a signal indicative of the detected tire air pressure or excessive or unallowable decrease (abnormality) of the detected tire air pressure. The microcomputer 3c produces a change-over signal to the change-over switch 3e to control the change-over switch 3e.

This change-over signal may be produced based on a signal received from the chassis ECU 5 or at a start of power supply thereto.

For example, as one power supply system A, all electric power to the receiver unit 3 may be supplied from a regulated power source (positive voltage source +B) connected to a battery (not shown). Alternatively, as the other power supply system B, only electric power to the change-over switch 3e may be supplied from the regulated power source and the other power to the receiver circuit 3b, the microcomputer 3c and the like may be supplied from an ignition (IG) power source, which is connected to the battery through the ignition switch.

In case of the power supply system A, the microcomputer 3c is operative even when the ignition switch is in the off-state. Therefore, the microcomputer 3c may control the change-over switch 3e by receiving from the chassis ECU 5 or the like a signal indicating the on/off state of the ignition switch. The power supply system A is advantageous in that the change-over switch 3e can be controlled by the microcomputer 3c even if the ignition switch is in the off-state. However, since the power is supplied continuously from the regulated power source even if the ignition switch is in the off-state, the power supply of the battery cannot be reduced.

In case of the power supply system B, the microcomputer 3c becomes operative only when the ignition switch IG is turned on. Therefore, until the ignition switch is turned on, the microcomputer 3e cannot receive the signal of the chassis ECU 5 indicating the on/off state of the ignition switch. For this reason, the change-over switch 3e may be configured to automatically take a predetermined switch position as long as the ignition switch 3e is in the off-state, and the change-over switch 3e may be controlled by the microcomputer 3c after the ignition switch is turned on. In this instance, change-over switch 3e cannot be controlled by the microcomputer 3c if the ignition switch is in the off-state. However, the power supply from the regulated power source to the receiver circuit 3b and the microcomputer 3c is not necessitated if the ignition switch is in the off-state. As a result, the power supply from the battery can be reduced.

The interface 3d is connected to the chassis ECU 5 via local lines 9a, 9b to perform local communications. Thus, the interface 3d outputs the signals received through the change-over switch 3e to the chassis ECU 5, and inputs signals received from the chassis ECU 5 to the microcomputer 3e.

The change-over switch 3e is connected to the receiver unit 4 through a local line 9c. The change-over switch 3e changes over its switch position to select either one of the output signal produced by the microcomputer 3c of the receiver unit 3 and the output signal applied from the receiver unit 4 through the local line 9c, so that the selected signal is produced to the chassis ECU 5 through the interface 3d. The change-over switch 3e receives a self-check signal from the microcomputer 3c through a first self-check line 10a connected to the local line 9c, which transmits the output signal of the receiver unit 4 of the remote key entry system. A signal produced from the change-over switch 3e is transmitted to the microcomputer 3c through a second self-check line 10b connected to an output line, through which the change-over switch 3e applies the signal to the interface 3d. Thus, the microcomputer 3c is capable of self-checking and confirming the operation of the change-over switch 3e. The switch position or condition of the change-over switch 3e is controlled by the switch signal SW applied from the microcomputer 3c.

The receiver unit 4 of the remote key entry system includes a second receiver antenna 4a, a second receiver circuit 4b, a second microcomputer 4c and a second interface 4d to receive and process the radio wave of the data signal transmitted from the key transmitter 2. The receiver unit 4 is operated with the power supply from the regulated power source (+B) so that the data signal transmitted from the key transmitter 2 may be received even if the ignition switch is in the off-state.

In the receiver unit 4, the receiver antenna 4a receives various signals including the data signal transmitted from the key transmitter 2, and the receiver circuit 4b processes the received signal and applies the processed signal to the microcomputer 4c.

The receiver circuit 4b is configured in the same manner as the receiver circuit 3b of the tire air pressure detection system. However, the receiver circuit 4b is so configured that its receivable frequency band matches the frequency band of the signal transmitted from the key transmitter 2.

The microcomputer 4c outputs the data signal received by the receiver circuit 4b and indicating a command of door lock or unlock to the change-over switch 3e through the interface 4d.

The interface 4d is connected to the change-over switch 3e and the chassis ECU 5 through the local lines 9c and 9d to perform local communications, respectively. The interface 4d transmits the output signals produced from the microcomputer 4c to the change-over switch 3e and transmits signals produced from the chassis ECU 5 to the microcomputer 4c. The local line 9b connected to the chassis ECU 5 is connected to the interface 3d of the receiver unit 3 and also to the local line 9d connected to the interface 4d of the receiver unit 4. As a result, the signal of the chassis ECU 5 is transmitted to both receiver units 3 and 4.

The chassis ECU 5 includes a third interface 5a and a third microcomputer 5b. The interface 5a receives the output signal and the like of the receiver unit 3 and the output signal and the like of the receiver unit 4. The microcomputer 5b processes the received output signals to produce the processed signals or data to the door control ECU 6 and the meter 7. The chassis ECU 5 is connected to the door control ECU 6 and the meter 6 through an in-vehicle LAN such as CAN so that signals are communicated one another. The microcomputer 5b of the chassis ECU 5 produces command signals, which indicate a self-check operation or a registration operation, through the interface 5a at the time of self-check operation or the registration operation. The microcomputers 3c and 3d receive these command signals from the chassis ECU 5 through the respective interfaces 3d and 4d.

The door control ECU 6 drives the door actuator 8 in response to the signals applied from the chassis ECU 5 to control locking and unlocking of doors.

The meter 7 displays an alarm, which indicates the detected tire air pressure or the abnormality (excessive decrease) of the detected tire air pressure in response to the signals applied from the chassis ECU 5. The indication of the abnormality of the detected tire air pressure may be performed by turning on an alarm light provided in the meter 7.

The operation of the embodiment configured as above is described in detail below.

It is first assumed that the ignition switch is in the off-state. In case of the power supply system A, all the parts of the receiver unit 3 are supplied with electric power from the regulated power source. The microcomputer 3c is operative and controls the change-over switch 3e by receiving from the chassis ECU 5 a signal indicating that the ignition switch is in the off-state. Specifically, the change-over switch 3e is controlled to transmit the signal produced from the receiver unit 4 to the chassis ECU 5. Thus, if the ignition switch is in the off-state, the door lock/unlock signal transmitted from the key transmitter 2 is applied to the chassis ECU 5 through the change-over switch 3e and the interface 3d, which are a part of the receiver unit 3.

The chassis ECU 5 receives the output signal including the specific ID and compares the specific ID with a pre-registered ID thereby to check whether the data signal is from the key transmitter 2 authorized to the subject vehicle. If the compared IDs agree, the chassis ECU 5 outputs its command signal to the door control ECU 6 in response to the received door lock/unlock signal, so that the door control ECU 6 drives the door actuator 8 to perform locking or unlocking of the doors.

In case of the power supply system B, only the change-over switch 3e is operable with the electric power from the regulated power source. As a result, the change-over switch 3e is driven to connect the receiver unit 4 to the chassis ECU 5 so that the output signal from the receiver unit 4 is automatically transmitted to the chassis ECU 5. Thus, the chassis ECU 5, the door control ECU 6 and the door actuator 8 operate in the same manner as in the case of the power supply system A.

If the ignition switch is turned on, in case of any of the power supply systems A and B, the change-over switch 3e is controlled by the microcomputer 3c to select and transmit the output signal produced by the receiver unit 3 to the chassis ECU 5. Thus, the data signal transmitted from the sensor transmitter 1 or other corresponding signals, which may indicate abnormality of the detected tire air pressure, is selected and transmitted to the chassis ECU 5 through the change-over switch 3e and the interface 3d.

The chassis ECU 5 determines the origin (location of the sensor transmitter 1) of the output signal based on the specific ID included in the output signal and drives the meter 7 to indicate thereon the detected tire air pressure or abnormality of the detected tire air pressure.

At the time of self-check operation, the chassis ECU 5 produces the check command signal to the microcomputer 3c through the local line 9b and the interface 3d so that the microcomputer 3c performs the self-check operation. In the self-check operation, the microcomputer 3c controls the change-over switch 3e to select and output the output signal produced from the receiver unit 4 of the remote key system. That is, the change-over switch 3e is driven to connect the local line 9c to the interface 3d. Under this condition, the microcomputer 3c produces the self-check signal to the self-check line 10a so that the self-check signal may be passed to the self-check line 10b through the change-over switch 3e. The self-check signal may be a pseudo signal, which is the same as the output signal produced to the local line 9c by the receiver unit 4 when the command signal is received from the key transmitter 2.

The self-check signal passing through the change-over switch 3e is returned to the microcomputer 3c through the self-check line 1013. The microcomputer 3c thus checks whether the change-over switch 3e is normal or abnormal by checking whether the same self-check signal transmitted through the self-check line 10a is returned.

At the time of registration of the receiver units 3 and 4, the chassis ECU 5 produces the command signals, which are for registering the receiver units 3 and 4 from the chassis ECU 5, to microcomputers 3c and 4c through the local lines 9b, 9d and the interfaces 3d, 4d. In case the command signal is for registering the receiver unit 3, the microcomputers 3c controls the change-over switch 3e to connect the microcomputer 3c to the interface 3d as in the case to transmit the output signal produced by the microcomputer 3c to the chassis ECU 5, and then transmits a signal including information related to the receiver unit 3 to the chassis ECU 5 through the change-over switch 3e. In case the command signal is for registering the receiver unit 4, the microcomputers 3c controls the change-over switch 3e to connect the microcomputer 4c to the interface 3d as in the case to transmit the output signal produced by the microcomputer 4c to the chassis ECU 5, and then transmits a signal including information related to the receiver unit 4 to the chassis ECU 5 through the change-over switch 3e. The information related to the receiver units 3 and 4 are registered in the chassis ECU 5.

According to the embodiment of the receiver system for vehicles, the receiver units 3 and 4 are provided separately, and the change-over switch 3e is provided in one (receiver unit 3) of the receiver units 3 and 4. The change-over switch 3e is controllable by the microcomputer 3c to select and transmit one of the output signals of the microcomputers 3c and 4c so that one of the output signals of the receiver units 3 and 4 is inputted to the chassis ECU 5. As a result, the output signals of the receiver units 3 and 4 can be selectively inputted to the chassis ECU 5 through only one interface 5a of the chassis ECU 5.

In sharing one ECU 5 by both of the receiver units 3 and 4 of different systems, one interface 5a of such an ECU 5 can be shared by the different systems.

In the embodiment, at the self-check time, the chassis ECU 5 transmits the command signal for the self-check operation to the microcomputer 3c, so that the change-over switch 3e is controlled to select and transmit the output signal of the receiver unit 4 and the pseudo signal is outputted as the self-check signal, which is the same as the output signal produced by the receiver unit 4 in response to the door lock/unlock signal of the key transmitter 2.

It is also possible in the embodiment that the change-over switch 3e is controlled to select and transmit the output signal of the receiver unit 3, and the pseudo signal is produced as the self-check signal, which is the same as the output signal produced in response to the data signal of the sensor transmitter 1. In this instance, the pseudo signal may be inputted to the change-over switch 3e through the self-check line 10a. Alternatively, the pseudo signal may be inputted to the change-over switch 3e through the data line DATA, which is normally used to input the data signal, by controlling the change-over switch 3e to a switch condition for selecting and transmitting the output signal of the microcomputer 3c even at the self-check time.

In the embodiment, in case of the power supply system A, the on/off condition signal indicating the ignition switch condition may be applied directly to the microcomputer 3c in place of applying it from the chassis ECU 5 to the change-over switch 3e. For example, the on/off condition of the ignition switch may be checked by the microcomputer 3c by supplying power of the ignition power source to the microcomputer 3c.

It is noted that the two systems may be other than the tire air pressure detection system and the remote key entry system, and that the change-over switch may be provided in a receiver unit of any one of the two systems.

What is claimed is:

1. A receiver system for vehicles having a first radio frequency (RF) transmitter and a second RF transmitter, the first transmitter transmitting a first data signal and the second transmitter transmitting a second data signal, the system comprising:

a first RF receiver unit including a first antenna for receiving the first data signal, a first receiver circuit for receiving an output signal of the first antenna corresponding to the first data signal, a first microcomputer for receiving an output signal of the first receiver circuit corresponding to the output signal of the first antenna, and a first interface for receiving and outputting an output signal of the first microcomputer corresponding to the output signal of the first receiver circuit;

a second RF receiver unit including a second antenna for receiving the second data signal, a second receiver circuit for receiving an output signal of the second antenna corresponding to the second data signal, a second microcomputer for receiving an output signal of the second receiver circuit corresponding to the output signal of the second antenna, and a second interface for receiving and outputting an output signal of the second microcomputer corresponding to the output signal of the second receiver circuit;

a shared electronic control unit including a shared third interface for receiving the output signal of the first interface and the output signal of the second interface, and a shared third microcomputer for producing an output signal by processing an output signal of the third interface, wherein the first receiver unit also includes a change-over switch, which is controlled by the first microcomputer, and which is connected for controllably selecting and transmitting one of the output signals of (a) the first microcomputer and (b) the second interface of the second receiver unit to the shared electronic control unit;

the change-over switch is supplied with electric power whether an ignition switch of the vehicle is in an on-state or an off-state, the first receiver circuit and the first microcomputer are being supplied with electric power only when the ignition switch is in the on-state;

the first microcomputer controls the change-over switch to transmit the output signal of the first receiver unit to the shared electronic control unit through the first interface when the ignition switch is in the on-state;

the change-over switch passes through the output signal of the second receiver unit to the shared electronic control unit through the first interface when the ignition switch is in the off-state; and wherein the first and second data signals include data indicative of a tire pressure of a vehicle and a command of locking/unlocking of a door of the vehicle, respectively.

2. The receiver system according to claim 1, wherein:
the change-over switch is configured to stop transmission of the output signal of the second receiver unit to the shared electronic control unit, when the output signal of the first microcomputer is selected and transmitted to the shared electronic control unit through the first interface.

3. The receiver system for vehicles according to claim 1, wherein:
the first receiver unit includes a first self-check line and a second self-check line, the first self-check line applying a self-check signal from the first microcomputer to the change-over switch and the second self-check line applying an output signal of the change-over switch to the first microcomputer; and
the first microcomputer controls the change-over switch to output the self-check signal applied from the first microcomputer through the first self-check line, and performs a self-check operation based on whether the self-check signal is received from the change-over switch through the second self-check line.

4. The receiver system for vehicles according to claim 3, wherein:
the first self-check line is connected to a local line connecting the second interface to the change-over switch;

the first microcomputer controls, at time of the self-check operation, the change-over switch to select and transmit the output signal of the second receiver unit, and produces as the self-check signal a pseudo signal, which is the same as the output signal produced by the second receiver unit when the data signal indicative of the command of locking/unlocking a door is received.

5. The receiver system for vehicles according to claim 3, wherein:
the first microcomputer controls, at time of the self-check operation, the change-over switch to select and transmit the output signal of the first microcomputer applied through the first self-check line, and produces as the self-check signal a pseudo signal, which is the same as the output signal produced by the first microcomputer when the data signal indicative of the tire air pressure is received.

6. A receiver system for vehicles having a first radio frequency (RF) transmitter and a second RF transmitter, the first transmitter transmitting a first data signal and the second transmitter transmitting a second data signal, the system comprising:

a first RF receiver unit including a first antenna for receiving the first data signal, a first receiver circuit for receiving an output signal of the first antenna corresponding to the first data signal, a first microcomputer for receiving an output signal of the first receiver circuit corresponding to the output signal of the first antenna, and a first interface for receiving and outputting an output signal of the first microcomputer corresponding to the output signal of the first receiver circuit;

a second RF receiver unit including a second antenna for receiving the second data signal, a second receiver circuit for receiving an output signal of the second antenna corresponding to the second data signal, a second microcomputer for receiving an output signal of the second receiver circuit corresponding to the output signal of the second antenna, and a second interface for receiving and outputting an output signal of the second microcomputer corresponding to the output signal of the second receiver circuit;

a shared electronic control unit including a shared third interface for receiving the output signals of the first interface and the output signals of the second interface, and a shared third microcomputer for producing an output signal by processing an output signal of the third interface, wherein the first receiver unit also includes a change-over switch, which is controlled by the first microcomputer, and which is connected for controllably selecting and transmitting one of the output signals of (a) the first microcomputer and (b) the second interface of the second receiver unit to the shared electronic control unit;

the first receiver unit is supplied with electric power only when an ignition switch of the vehicle is in the on-state;

the first microcomputer receives a condition signal indicative of an on/off condition of the ignition switch, and controls the change-over switch to transmit the output signal of the first microcomputer and the output signal of the second receiver unit to the shared electronic control unit through the first interface when the condition signal indicates the on-state and the off-state of the ignition switch, respectively; and wherein the first and second data signals include data indicative of a tire pressure of a vehicle and a command of locking/unlocking of a door of the vehicle, respectively.

7. The receiver system for vehicles according to claim 6, wherein:
the electronic control unit produces a request signal for registration of a remote key for locking/unlocking; and the first microcomputer controls, in response to the request signal, the change-over switch to select and transmit the output signal of the second receiver unit to the shared electronic control unit through the first interface.

\* \* \* \* \*